Patented Mar. 23, 1943

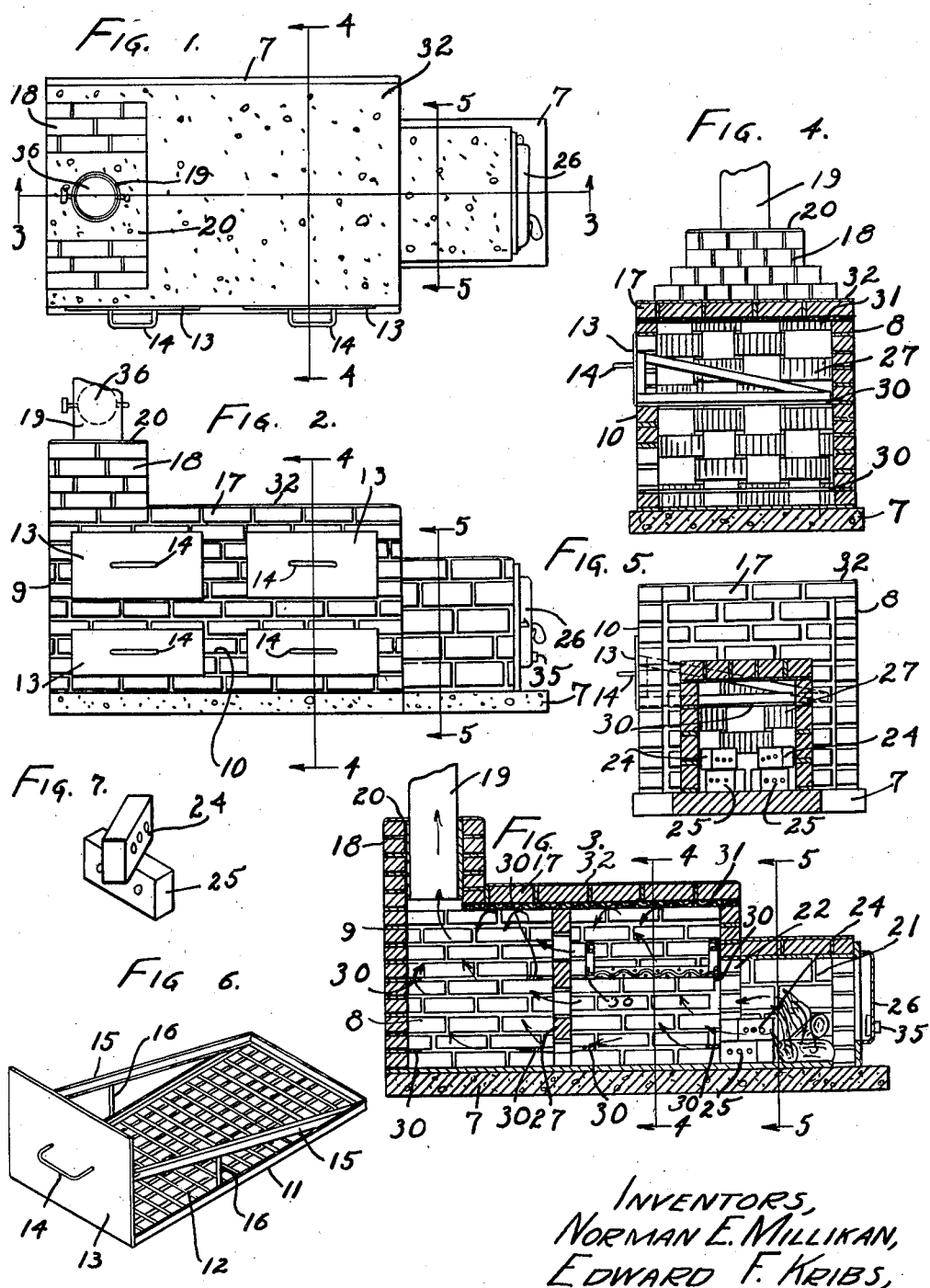

2,314,627

UNITED STATES PATENT OFFICE 2,314,627

BARBECUE OVEN

Norman E. Millikan, Brownsburg, and Edward F. Kribs, Indianapolis, Ind.

Application October 17, 1941, Serial No. 415,364

6 Claims. (Cl. 126—25)

This invention relates to improvement in ovens for broiling chicken, pigs, spare ribs, steaks and other meats in what is known as barbecue style, wherein the material is subjected to the direct heat and smoke of a wood fire, in order to impart to it the flavor of the wood, preferably hickory.

The object of the invention is to conduct the heat and smoke through a plurality of ovens at different distances from the fire in order to quickly sear the meat and retain the juices; then conduct them through baffles to ovens more remote where the broiling is continued until done to suit the taste of the consumer, and to still another oven which serves more as a warming than as a broiling oven.

A further object is to provide slidingly removable grids upon which the material to be broiled is spread and retained and adapted to be slid into the oven or withdrawn for inspection, and also for transfer from the searing ovens to the finishing ovens.

The object also is to provide an oven that can be inexpensively built by any person who can lay brick, and that will require very little wood for heating it.

We accomplish the above, and other objects which will hereinafter appear, by the means illustrated in the accompanying drawing, in which Fig. 1 is a top plan view of our oven;

Fig. 2 is a side elevational view of same;

Fig. 3 is a longitudinal sectional view on the line 3—3 of Fig. 1;

Fig. 4 is a transverse sectional view on the line 4—4 of Figs. 1, 2 and 3;

Fig. 5 is a transverse sectional view on the line 5—5 of Figs. 1, 2 and 3;

Fig. 6 is a perspective view of a grid, removed from the oven; and

Fig. 7 is a perspective view of a crossed brick baffle.

Like characters of reference indicate like parts in the several views of the drawing.

The oven is built upon a monolithic, concrete base 7. A vertical side wall 8 is built out of bricks, here shown as laid with mortar in a single course resting upon the base 7. The end 9 is built in like manner out of bricks and is carried up in the middle higher than wall 8, as part of a chimney.

The wall 10, parallel with wall 8, also of brick, rests upon the base 7, and is provided with four rectangular openings arranged in two vertical pairs, for the insertion and removal of grids upon which the material to be broiled is placed. As here shown, the two lower openings are somewhat narrower vertically than the upper ones, but they may be of the same size or otherwise varied if desired.

As the grids are of the same general construction, a description of one will suffice for all. The grids comprise a rectangular horizontal metal frame 11 to which is secured the grill bottom 12, here shown as metal rods crossing at right angles. Their ends are spot welded or otherwise secured to the frame and the rods may be spot welded at their intersections. This grill bottom may also be made out of heavy woven wire. To one end of the frame 11 a metal plate 13 is fixed, which plate overlaps the margin of the hole in the brick wall and acts as a stop and also as a closure. It is provided with an outside hand pall 14. A diagonal brace bar 15 extends from the plate 13 to the far end of the frame 11 on each side of the latter and these brace bars preferably have supports 16 from the frame. This construction provides a grid that tapers to its inserting end and with open sides that present no obstruction to hot air and smoke flow across the grid.

Strap iron tracks 30 are provided to support the grid frame 11, the ends of the straps being supported in the side walls of the broiling chamber.

The top 17 of the oven is made out of a horizontal layer of bricks supported by a sheet of woven wire 31 laid on the tops of walls 8 and 10, and a layer of cement 32 is spread over the bricks.

A chimney 18 of brick supports a metal pipe 19 by a concrete cover 20. The pipe 19 communicates with the interior of the oven as shown in Fig. 3.

A combustion chamber 21 has side walls built out of brick, preferably fire brick, here shown turned edge up. It is narrower and lower than the oven and communicates with the interior of the oven through an opening 22 in the inner end of the oven. The bottom of the combustion chamber is separated from the interior of the oven by a double pair of bricks (Fig. 5). The bricks 24 and 25 of each pair are laid edge up, one on top of the other, but crossed as shown best in Fig. 7 to form a baffle for distributing the heat and smoke and to retain the ashes in the fire box.

A door 26 is of any usual and suitable construction for ready access to the combustion chamber.

Wood, preferably hickory on account of its superior heating qualities and flavor of the smoke, is burned on the bottom of the combustion chamber.

A transverse partition of bricks 27 of checkerboard structure forming open space air passages between the ends of the bricks, divides the oven centrally and forms a baffle for the smoke and heat between the chambers thus defined on each side of the partition.

The operation of our oven is as follows: With all four of the grids in and loaded and the outside openings closed by plates 13, heat from the combustion chamber passes most freely to the front lower grid, past the baffles 24 and 25 and over their tops; thence up through the front upper grid, to be deflected down from the oven top; thence through the baffle 27 to the top rear grid to be deflected down from the oven top, and out through the pipe 19.

The heat to the lower front grid is most intense and sears the meat; next in intensity is the heat to the upper front grid and then the upper rear one. The grids, being removable and interchangeable, may be shifted from one compartment to another for selective heat intensities, and by drawing out the grids the progress of broiling is checked. The lower rear grid serves more as a warmer to keep the food in right condition for the table.

The door to the combustion chamber has a damper 35 and the smoke pipe a damper 36, both of usual construction, for the control of the heat.

While we have herein shown and described our invention in the best form known to us, it is obvious that structural variations may be employed without departing from the spirit of the invention and we, therefore, do not desire to be limited to that precise form beyond the limitations as may be imposed by the following claims.

We claim:

1. In a barbecue oven, a broiling chamber, a combustion chamber opening into the broiling chamber, and heat and smoke distributors in the opening to mix and distribute the products of combustion in the broiling chamber, said distributors comprising edge-up bricks placed obliquely to the wall through which the opening is formed, the directions of the bricks being in alternately opposite directions.

2. In a barbecue oven, a broiling chamber divided into compartments by a baffle partition made of bricks with open space air passages between the ends of the bricks, said broiling chamber having openings into the compartments, grids removably entering the compartments through said openings and having plate members closing the openings when in, and a combustion chamber having an opening through which the products of combustion are discharged into the broiling chamber.

3. In a barbecue oven, a broiling chamber divided into compartments by a baffle partition made of bricks with open space air passages between the ends of the bricks, said broiling chamber having openings into the compartments, grids removably entering the compartments through said openings and having plate members closing the openings when in, a combustion chamber having an opening through which the products of combustion are discharged into the broiling chamber, a baffle in the last opening formed of bricks set edge up on each other with their faces oblique to the wall in which the opening is formed and in alternate opposite directions, and damper means for controlling the heat.

4. In a barbecue oven, a broiling chamber, a partition dividing the chamber into two compartments, said partition made of bricks set edge-up with staggered open space air passages between the ends of the bricks, a wall of said chamber having an upper and a lower opening into each of the two compartments, grids removably entering the compartments through said openings, said grids having plates to close the openings when in, and a combustion chamber having an opening through which the products of combustion are discharged into the broiling chamber.

5. In a barbecue oven, a broiling chamber, a partition dividing the chamber into two compartments, said partition made of bricks set edge-up with staggered open space air passages between the ends of the bricks, a wall of said chamber having an upper and a lower opening into each of the two compartments, grids removably entering the compartments through said openings, said grids having plates to close the openings when in, and a combustion chamber having an opening through which the products of combustion are discharged into the broiling chamber, a baffle in the last opening formed of bricks set edge-up on each other with their faces oblique to the wall in which the opening is formed, and in alternate opposite directions, and damper means for controlling the heat.

6. In a barbecue oven, a plurality of broiling chambers separated by a checkerboard baffle, each having a grid opening with a leading-in track, in combination with a grid sliding in and out on the track for selective heat intensities in the heating chambers, said grid comprising a frame supporting a perforate floor, and an outer end plate closing the opening when the grid is in its innermost position.

NORMAN E. MILLIKAN.
EDWARD F. KRIBS.